US007785475B2

(12) United States Patent
Saho et al.

(10) Patent No.: US 7,785,475 B2
(45) Date of Patent: Aug. 31, 2010

(54) MAGNETIC SEPARATION PURIFYING APPARATUS AND MAGNETIC SEPARATION PURIFYING METHOD

(75) Inventors: Norihide Saho, Tsuchiura (JP); Hisashi Isogami, Ushiku (JP); Takashi Mizumori, Kasama (JP); Akira Mochizuki, Mito (JP); Susumu Harada, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 11/630,128

(22) PCT Filed: Apr. 28, 2005

(86) PCT No.: PCT/JP2005/008581

§ 371 (c)(1),
(2), (4) Date: Dec. 29, 2006

(87) PCT Pub. No.: WO2006/117880

PCT Pub. Date: Nov. 9, 2006

(65) Prior Publication Data

US 2008/0029457 A1 Feb. 7, 2008

(51) Int. Cl.
*C02F 1/44* (2006.01)

(52) U.S. Cl. ........................ 210/695; 210/223; 210/404; 210/784; 209/214; 209/221; 209/225

(58) Field of Classification Search ................. 210/222, 210/223, 695, 167.29, 402, 404, 783–784; 209/214, 217, 221, 225
See application file for complete search history.

(56) References Cited

U.S. PATENT DOCUMENTS 2,466,839 A * 4/1949 Caldwell .................... 210/222
2,698,685 A 1/1955 Newton
2,854,137 A * 9/1958 Grunel ....................... 209/215

(Continued)

FOREIGN PATENT DOCUMENTS

DE 1 273 452 7/1968

(Continued)

OTHER PUBLICATIONS

Definition of Concentric, Merriam-Webster Online Dictionary, Available at www.merriam-webster.com, Accessed Dec. 8, 2009.*

(Continued)

*Primary Examiner*—Tony G Soohoo
*Assistant Examiner*—David C Mellon
(74) *Attorney, Agent, or Firm*—Antonelli, Terry, Stout & Kraus, LLP.

(57) ABSTRACT

A magnetic separation purifying apparatus includes a cylindrical-shaped sludge recovery rotating body rotating to place sludge and a magnetic substance on a surface thereof to convey the same; a magnetic rotating body, which has an axis in the sludge recovery rotating body and includes a rotating body and a plurality of magnets mounted on its circumference, at least a side of which is arranged close to an inner peripheral surface of the sludge recovery rotating body, by which a magnetic substance is magnetically attracted to a surface of the sludge recovery rotating body whereby sludge is transported onto the surface of the sludge recovery rotating body; and a scraping device that scrapes sludge and a magnetic substance being transported on the surface of the sludge recovery rotating body.

7 Claims, 3 Drawing Sheets

U.S. PATENT DOCUMENTS

| | | | | | |
|---|---|---|---|---|---|
| 4,039,447 | A | * | 8/1977 | Miura et al. | 210/425 |
| 5,494,172 | A | | 2/1996 | Siesco, Jr. | |
| 5,685,993 | A | * | 11/1997 | Liu | 210/695 |
| 6,230,897 | B1 | | 5/2001 | Exner | |
| 2004/0040894 | A1 | | 3/2004 | Warlitz et al. | |

FOREIGN PATENT DOCUMENTS

| | | | |
|---|---|---|---|
| DE | 196 49 154 | C1 | 3/1998 |
| EP | 0 439 983 | A | 8/1991 |
| EP | 1243559 | | 9/2002 |
| JP | 63-103936 | | 7/1988 |
| JP | 06-000409 | | 1/1994 |
| JP | 09-001176 | | 1/1997 |
| JP | 9024205 | | 1/1997 |
| JP | 2000-079353 | | 3/2000 |
| JP | 2000-246137 | | 9/2000 |
| JP | 2002-066375 | A | 3/2002 |
| JP | 2002-273261 | | 9/2002 |
| WO | WO 2004/082839 | A1 | 9/2004 |

OTHER PUBLICATIONS

EP Office Action of Appln. 05738758.1 dated Mar. 16, 2010 in English.

* cited by examiner

MAGNETIC SEPARATION PURIFYING APPARATUS AND MAGNETIC SEPARATION PURIFYING METHOD

BACKGROUND OF THE INVENTION

The present invention relates to a magnetic separation purifying apparatus intended for purification of water quality, solid-liquid separation, etc., and more particular, to a construction of a magnetic separation purifying apparatus capable of favorably separating a magnetic substance irrespective of fluctuation of a water surface in a magnetic separation part and stably discharging a high density sludge in trapping of the magnetic substance and magnetic separation of a trapped substance with a membrane.

Intended for solid-liquid separation, etc. is a magnetic separation purifying apparatus, in which a thin wire net, a net knitted from polymeric fiber, and a film are used as a water separation membrane, a coagulant and magnetic powder are added to raw water containing polluted particles (called sludge) to generate magnetic flocs, the magnetic flocs are separated by the membrane, and the magnetic flocs collected by the membrane is magnetically separated and removed by magnetic field generating means, and a high concentration sludge is recovered. The construction is described in, for example, JP-A-2002-273261. The membrane separation purifying apparatus comprises a net formed from thin wire of stainless steel, polymeric fiber, etc. and having mesh size of, for example, several tens of micron meters. In order to separate a minute polluted substance smaller than a projected area or a projected diameter of the net, a coagulant such as aluminum sulfate, poly aluminum chloride, and poly iron sulfate, and magnetic powder are beforehand added to raw water to be agitated to form magnetic flocs, in which the coagulant joins minute solid suspended matters, alga, fungus, and microorganism in the raw water and which has a magnitude of several hundreds of micron meters. Such magnetic flocs cannot pass through the membrane, of which mesh size is several tens of micron meters, but is caught and separated at a high extraction ratio, and water having permeated the membrane makes a purified water of high water quality.

After the magnetic flocs collected on the membrane is washed away from the membrane by a wash water, magnetic flocs staying in the vicinity of a water surface is attracted and magnetically separated by a magnetic force of a magnet, which is made stationary and arranged in the vicinity of the water surface, and transported and removed into a sludge recovery tank by sludge transport means.

Finally, sludge is normally conveyed to a disposal site or an incineration plant by a truck to be composted.

JP-B2-3228430 describes a sewage disposal apparatus, in which magnetic powder in sewage having flowed into a sewage disposal tank is attracted and separated from the sewage by a magnetic plate arranged in the sewage disposal tank to be discharged outside the sewage disposal tank. The sewage disposal apparatus comprises: the sewage disposal tank provided at a lower portion thereof with a sewage inflow port and at an upper portion thereof with an exhaust port for water to be processed; a plurality of disk-shaped magnetic bodies immersed and arranged in sewage in the sewage disposal tank and aligned and mounted on a rotating shaft at predetermined intervals; a plurality of permanent magnet pieces mounted on surfaces of the respective disk-shaped magnetic bodies and arranged so that opposed magnetic poles are different from each other between opposed disk-shaped magnetic bodies; a scraping device composed of an endless belt with scrapers and going around to scrape sludge attracted to surfaces of the permanent magnet pieces and to move the scraped sludge to above the disk-shaped magnetic bodies; a sludge discharge passage provided in sewage in the sewage disposal tank to surround the scraping device to guide that sludge, which is scraped by the scraper, to a sludge discharge port; and an overflow port formed in communication with the sludge discharge passage to permit the water to be processed in the sludge discharge passage to overflow.

JP-A-2002-79353 describes a rotating drum type magnetic separation apparatus comprising an inner cylinder housed in a rotating drum made of a non-magnetic material and arranging magnets in desired positions on an outer peripheral surface thereof, and a squeezing roller and a scraper, which abut against the rotating drum, the rotating drum having the whole or desired portions of a surface thereof magnetized at a desired depth.

As described above, the prior art involves a problem that since the magnetic flocs washed away from the membrane and staying in the vicinity of a water surface is magnetically attracted by a stationary magnetic field distribution of a stationary magnet, the capacity of removing many magnetic flocs present in the vicinity of the water surface is lowered, magnetic flocs in the water to be processed are heightened in density, the purifying rate by the membrane is decreased, and the purifying capacity is lowered in the case where the water surface fluctuates up and down and a magnetic force at the water surface is in a weak level.

On the other hand, in the case where sludge is conveyed to a disposal site or an incineration plant by a truck and in the case where sludge is composted, sludge must be decreased in water content prior to conveyance and compost treatment so as to make the water content about 85% for prevention of leakage of the water from the sludge at the time of transportation and to make the water content about 75% for activation of microorganism, which decomposes an organic matter at the time of compost.

Here, there is caused a problem that when the purifying rate by the membrane is decreased and a water surface of the water to be processed rises, the water to be processed containing magnetic flocs overflows into a sludge recovery tank, which is disposed adjacent to the filtering water tank to magnetically separate, remove and recover magnetic flocs as a high concentration sludge, and the sludge recovered at high concentration is considerably diluted with the inflowing water to be processed to become low in concentration to be considerably increased in volume, thus resulting in an increase in dehydration cost when the water content is made small.

BRIEF SUMMARY OF THE INVENTION

It is an object of the invention to provide a magnetic separation purifying apparatus capable of favorably separating magnetic flocs containing a magnetic substance and stably discharging high density sludge irrespective of fluctuation of a water surface in a magnetic separation part.

Also, the invention prevents sludge recovered at high concentration from being diluted with the overflowing water to be processed in the case where a water surface of the water to be processed rises.

By making a magnet, which is used for magnetic separation of magnetic flocs, a rotating type, a magnetic force increases periodically in a position of the water surface even when the water surface fluctuates up and down. Thereby, many magnetic flocs present in the vicinity of the water surface are favorably and magnetically attracted. By virtue of this, it is possible to solve a problem of a decrease in the capacity of removing magnetic flocs.

Also, a sewage recovery layer, which collects sewage, is provided between a water tank, which filters the water to be processed, and a sludge recovery tank to prevent the overflowing water to be processed from flowing into a sewage recovery tank and flowing into the sludge recovery tank in the case where a water surface of the water to be processed rises. Since such construction can prevent high concentration sludge in the sludge recovery tank from being diluted with the water to be processed, it is possible to prevent an increase in sludge volume, thus enabling solving a problem of an increase in dehydration cost when sludge as recovered is made small in water content.

A magnetic separation purifying apparatus constructed according to the invention comprises: a rotatable filtering means that filters processed fluid containing a magnetic substance, which gives magnetism to a removed matter by means of addition of a magnetic body and a coagulant, or an additive, which chemically reacts with a removed matter to generate a magnetic body, to the processed fluid containing the magnetic substance of a removed matter with magnetism, or fluid containing a removed matter with non-magnetism, the filtering means having mesh size, through which the removed matter and the magnetic substance cannot pass; a rotatable magnetic field generating means that has the magnetic substance, which is filtered by the filtering means, magnetically attracted by a magnetic force; a rotatable sludge recovery means that places the magnetic substance and magnetic flocs containing sludge on a surface thereof to recover the same when the magnetic substance as magnetically attracted moves in a space in a direction toward the magnetic field generating means; and magnetic field rotating means that rotates the magnetic field generating means, the sludge recovery means being constructed to move between spaces, in which the magnetic field generating means is large and small in field strength and provided with scraping means, which scrapes sediment on the sludge recovery means. Further, sludge collecting means is provided to recover the removed matter and the magnetic substance.

Also, a magnetic separation purifying apparatus constructed according to the invention comprises: a rotatable filtering means that filters processed fluid containing a magnetic substance, which gives magnetism to a removed matter by means of addition of a magnetic body and a coagulant, or an additive, which chemically reacts with a removed matter to generate a magnetic body, to the processed fluid containing the magnetic substance of a removed matter with magnetism, or fluid containing a removed matter with non-magnetism, the filtering means having mesh size, through which the removed matter and the magnetic substance cannot pass; magnetic field generating means that has the magnetic substance, which is filtered by the filtering means, magnetically attracted by a magnetic force; and sludge recovery means that places magnetic flocs on a surface thereof to recover the same when the magnetic substance as magnetically attracted moves in a space in a direction toward the magnetic field generating means, the sludge recovery means being constructed to be able to move between spaces, in which the magnetic field generating means is large and small in field strength and provided with scraping means, which scrapes sediment on the sludge recovery means, the apparatus further comprising: sludge collecting means that recovers the removed matter and the magnetic substance, and overflowing water collecting means provided between a water tank having the filtering means and the sludge collecting means to permit the fluid to be processed prior to flowing into the filtering means to overflow thereinto.

The magnetic separation purifying apparatus described above comprises sediment transporting means that causes the scraping means to transport the sediment on the sludge recovery means in a direction of transportation of the sediment.

According to the invention, there is provided a magnetic separation purifying apparatus that favorably separates magnetic flocs (containing sludge and a magnetic substance) irrespective of fluctuation of a water surface in a magnetic separation part formed between a filter net (net) and a rotating sludge recovery body, and stably generates high density sludge to be able to discharge the same.

Also, according to the invention, since an overflowing water collecting device is provided in a water tank, sludge recovered at high concentration is not diluted with overflowing of water to be processed also in the case where a water surface of the water to be processed rises.

DETAILED DESCRIPTION OF THE INVENTION

Figure 1:
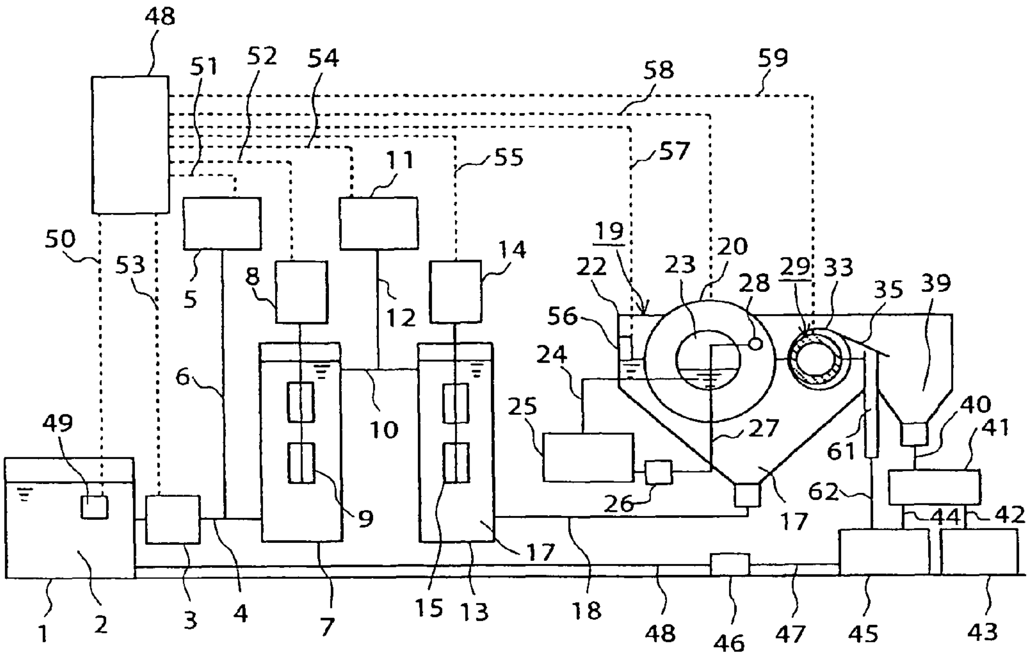
FIG. 1 is a view showing a configuration of a magnetic separation purifying system according to an embodiment of the invention.

A magnetic separation purifying apparatus making use of a magnetic force to separate sludge contained in water to be processed and to purify the water to be processed comprises a rotating filtering body arranged in a water tank to have a cylindrical-shaped filtering net to filter sludge and a magnetic substance from the water to be processed containing the magnetic substance, a cylindrical-shaped sludge recovery rotating body facing the rotating filtering body to be horizontally close thereto, the sludge recovery rotating body rotating to place sludge and a magnetic substance on a surface thereof to convey the same, a magnetic rotating body, which has an axis in the sludge recovery rotating body and comprises a rotating body and a plurality of magnets mounted on a circumference of the rotating body, at least a side of which toward the rotating filtering body is arranged close to an inner peripheral surface of the sludge recovery rotating body, by which a magnetic substance filtered by the rotating filtering body is magnetically attracted to a surface of the sludge recovery rotating body whereby sludge is transported to the surface of the sludge recovery rotating body, and a scraping device that scrapes sludge and a magnetic substance being transported to the surface of the sludge recovery rotating body.

Further, the magnetic rotating body is arranged eccentric relative to the sludge recovery rotating body.

Further, the magnetic rotating body may be arranged coaxial with the sludge recovery rotating body, in which case a rotary vane rotationally driven by a drive source is provided above and close to a surface of the sludge recovery rotating body.

Further, the sludge recovery rotating body and the magnetic rotating body can be unified with each other to make a rotary drive source common thereto.

Further, it is possible to provide an overflowing water collector, into which water to be processed from the water tank overflows.

Also, a magnetic separation purifying method that makes use of a magnetic force to separate sludge contained in fluid to be processed to purify the fluid to be processed, the magnetic separation purifying method comprising filtering sludge and a magnetic substance from water to be processed containing the magnetic substance by means of a rotating filtering body arranged in a water tank to have a cylindrical-shaped filtering net, using a magnetic rotating body, which has an axis in a cylindrical-shaped sludge recovery rotating body, at least a side of which toward the rotating filtering body is arranged close to an inner peripheral surface of the sludge recovery rotating body, and which comprises a plurality of circumferentially arranged magnets, to magnetically attract a magnetic substance, which is filtered by the rotating filtering body to stay on a water surface of the fluid to be processed between the magnetic rotating body and the rotating filtering body, to a surface of the sludge recovery rotating body and to transport sludge to the surface of the sludge recovery rotating body, and scraping magnetic flocs containing sludge and a magnetic substance being transported onto the surface of the sludge recovery rotating body.

Further, the magnetic rotating body is arranged eccentric relative to the sludge recovery rotating body whereby the sludge recovery rotating body rotates in spaces, which are large and small in magnetic intensity.

Embodiment 1

Figure 2:
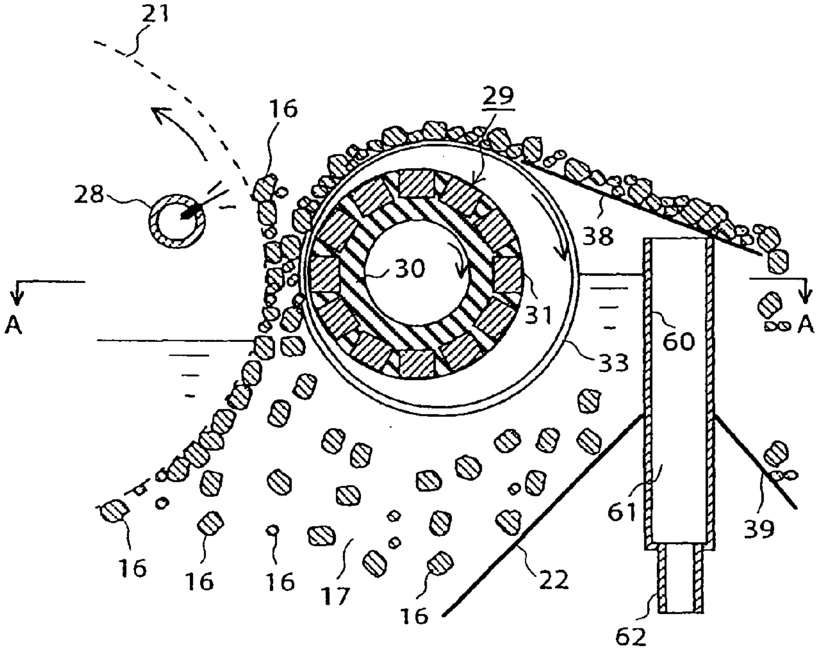
FIG. 2 is a cross sectional view showing a magnetic separation purifying apparatus according to an embodiment of the invention.
Figure 3:
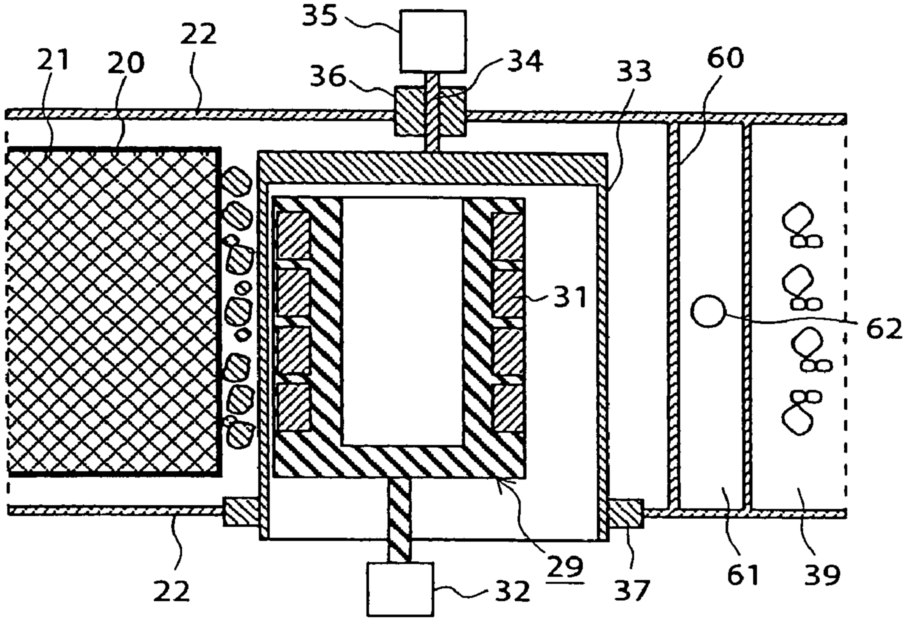
FIG. 3 is a cross sectional view taken along the line A-A in FIG. 2.

An embodiment of the invention will be described below with reference to FIGS. 1, 2, and 3. FIG. 2 is an enlarged, cross sectional view showing a membrane separation apparatus 14 and FIG. 3 is a cross sectional view taken along the line A-A in FIG. 2.

Raw water 2 which is water to be processed and contains sludge, and from which large dirt of several mm is removed, is stored in a raw water storage tank 1, and a pump 3 feeds a predetermined amount of the raw water 2 to a pipe 4. Magnetic powder such as iron oxide tetroxide, etc., a pH conditioner, a coagulating agent, which provides aluminum ion and iron ion such as a water solution of polychlorinated aluminum, ferric chloride, ferric sulfate, etc., a polymeric reinforcing agent, etc. from a seeding agent regulator 5 are added into the pipe 4 through a conduit pipe 6 to be agitated in an agitating tank 7 at high speed by agitating blades 9, which are rotationally driven by a motor 8, thus generating a magnetic, micro-flocs (magnetic flocs) of several hundreds of micron meter. Thereafter, a polymeric reinforcing agent, etc. from a polymeric agent regulator 11 is added into a pipe 10 through a conduit pipe 12 to be agitated slowly at low speed by agitating blades 5, which are driven in rotation by a motor 14 in an agitating tank 13, thus generating water to be processed 17 prior to processing and containing a magnetic flocs 16 (not shown in FIG. 1) having a size in the order of several micron meter. In some cases, fluid to be processed is free from addition and contains a magnetic substance which is a matter to be removed and possessing magnetism originally.

The water to be processed 17 thus generated is led to a magnetic separation purifying apparatus 19 through a conduit pipe 18. A construction of the magnetic separation purifying apparatus 19 will be described with reference to FIGS. 2 and 3. A net 21 which is a filter of a thin wire of stainless steel, a thin wire of copper, polyester fiber, etc. having a mesh size of several micron meter to several tens of micron meter is provided on an outer peripheral surface of a rotating drum 20 rotated by a drive source (not shown). That is, a filtering net formed to be cylindrical in shape is provided. A rotating filtering body is formed by the rotating drum 20 and the net 21.

The water to be processed 17 having flown into a water tank 22 passes through the net 21 to flow into the drum 20. At this time, the magnetic flocs 16 containing sludge and a magnetic substance in the water to be processed are caught by an inner surface of the net 21, and water passing through the net 21 and having the magnetic flocs 16 separated therefrom becomes a purified water to be discharged from an opening 23 to pass through a pipe 24 to accumulate in a purified water tank 25 to be evacuated outside the system. Power, with which the water to be processed 17 is caused to pass through the net 21, is given by a difference in liquid level between the water to be processed 17 and the purified water in the drum 20.

On the other hand, as shown in FIG. 2, the magnetic flocs 16 are filtered by an outer peripheral surface of the net 21, which rotates counterclockwise, to adhere thereto to make sediment to be exposed to an atmospheric region above the liquid level.

The purified water in the purified water tank (referred to as water tank) 25 is pressurized by a pump 26 to be fed to a shower pipe 28 from a conduit pipe 27, and a shower water from holes is blown against an outer surface side of the net 21 from an inner surface side thereof. The magnetic flocs 16 accumulated on the outer peripheral surface of the net 21 are peeled off by the shower water and the net 21 is thus regenerated. The magnetic flocs 16 thus washed away stay between the net and a sludge recovery body, described later, on a water surface of the water to be processed 17 in the water tank 22.

A rotary type magnetic rotating body 29 used as magnetism generating means for magnetic separation is constructed such that permanent magnets 31 are fixed to a plurality of grooves on a circumference, for example, an outer surface of a rotating body 30 manufactured from a non-magnetic material by an adhesive or the like, and the rotating body 30 is controlled in rotational frequency and rotated by a motor 32. The permanent magnets 31 are regularly arranged with minute clearances therebetween in a circumferential direction and in a direction along a cylindrical surface and fixed firmly to the rotating body 30.

On the other hand, a rotating body 33 manufactured from a non-magnetic material and used to transport the magnetic flocs having been subjected to magnetic separation are controlled in rotational frequency and rotated by a motor 32 through a shaft 34. The shaft 34 at an end of the rotating body is supported on a wall of the water tank 22 by a watertight rotating support 36 and an outer peripheral portion of the rotating body 33 at the other end thereof is supported on a wall of the water tank 22 by a watertight rotating support 37, an interior of the rotating support 36 being opened to the atmosphere. The sludge recovery body 33 is arranged close to the rotating drum in a horizontal direction. The horizontal direction includes almost horizontal direction.

The magnetic rotating body 29 is inserted into the sludge recovery rotating body 33 from an atmospheric opened surface of the sludge recovery rotating body 33 to be arranged close to a position toward the rotating drum, in which the magnetic flocs 16 washed away by a wash water stay in group. Here, according to the embodiment, an axis of the sludge recovery rotating body 33 and an axis of the rotating body 30 of the magnetic rotating body 29 are arranged offset from each other. That is, an axis of the sludge recovery rotating body and an axis of the magnetic rotating body 29 are made eccentric relative to each other. While not shown in the drawings, the magnetic rotating body 29 is fixed to a part of the water tank 22 by bolts or the like so as to be positioned in a predetermined location. The sludge recovery rotating body 33 and the rotating body 30 rotate in the same direction to move the group of magnetic flocs 16 as magnetically attracted, toward the atmosphere. The both bodies may be the same as or different from each other in rotational frequency. According to the embodiment, the rotating body 30 on a side of magnets is larger in rotational frequency than the sludge recovery rotating body 33. That is, the rotating body is larger in rotating speed than the sludge recovery rotating body.

In this manner, since the magnetic rotating body 29 arranged close to the sludge recovery rotating body 33 is made a rotary type, a magnetic force in a water surface position becomes strong periodically even when a water surface of the water to be processed fluctuates vertically, so that a multiplicity of magnetic flocs present in the vicinity of the water surface are favorably attracted magnetically.

A group of magnetic flocs 16 washed off and staying in the vicinity of the water surface is attracted toward the magnets by a magnetic field of the magnetic rotating body 29 to adhere to an outer surface of the sludge recovery rotating body 33, which rotates outside the magnetic rotating body 29, and thereafter exposed to the atmosphere with the rotation of the sludge recovery rotating body 33. In the atmosphere, surplus moisture in the group of magnetic flocs 16 flows down the surface of the rotating body 33 due to gravity and the group of magnetic flocs 16 is further concentrated. Here, moisture content of the magnetic flocs goes down to the order of 97%.

The group of magnetic flocs 16 as concentrated on the surface of the rotating body 33 is moved upon rotation of the rotating body 33. At this time, since the axis of the sludge recovery rotating body 33 and the axis of the rotating body 30 are arranged offset from each other, that is, the magnetic flocs are moved in spaces, in which a magnetic field becomes large and small in magnetic intensity, the magnetic flocs are intensely attracted in a space of small magnetic intensity, and when they become more distant from the magnetic rotating body 29, magnetic attraction decreases rapidly with a distance from the magnetic rotating body 29. The group of magnetic flocs 16 is peeled off the surface of the sludge recovery rotating body 33 by a spatula 38, which is partially supported on the water tank 22 in a manner to scrape the magnetic flocs, and drops onto a sludge recovery tank 39 by gravity to be separated and collected as sludge.

The discharged sludge is introduced into a dehydration equipment 41, such as a centrifugal separator, a belt press, etc., through a pipe 40, and a high concentration sludge concentrated to a moisture content of about 85% or less to eliminate leakage of water from the sludge at the time of transportation, or a moisture content of about 75% to achieve activation of microorganism, which decomposes an organic substance at the time of compost, is accumulated through a pipe 42 in a sludge reservoir 43. The sludge is transported to a disposal site, an incineration site, or a manure processing site by a truck.

The processed wastewater dewatered by the dehydration equipment enters a processed wastewater tank 45 through a pipe 44 to be pressurized by a pump 46 to thereafter return to the raw water storage tank 1 through a pipe 47 to be again introduced into a processed step.

In an operation controller 48, a liquid level, turbidity, temperature, and a pH value, etc. of raw water are measured by a sensor 49, and the information is transmitted to the operation controller 48 via a signal line 50. On the basis of the information, dosage of an agent (pH conditioner, magnetic powder, coagulant), which is optimum to generate favorable magnetic flocs, is calculated with an optimum amount calculation program beforehand input, the control information is transmitted to the agent tank 5 via a signal line 51, and an optimum amount is added. Also, at the same time, a rotational frequency of the agitation motor and time of staying in the agitating tank are calculated in the operation controller 48, the control information is transmitted to the motor 8 via a signal line 52 to rotate the agitating blades 9 at an optimum rotational frequency, and transmitted via a signal line 53 to control a discharge rate of the pump 3, which determines time of staying in the agitating tank.

Also, dosage of an agent (polymer), which is optimum to generate favorable magnetic flocs, is calculated with an optimum amount calculation program beforehand input, the control information is transmitted to the agent tank 11 via a signal line 54, and an optimum amount is added. Also, at the same time, a rotational frequency of the agitation motor is calculated in the operation controller 48, the control information is transmitted to the motor 14 via a signal line 55, and agitating blades 15 are rotated at an optimum rotational frequency.

On the other hand, in the magnetic separation purifying apparatus 19, a sensor 56 measures a liquid level of the water to be processed 17 in the tank 22, and the information is transmitted to the operation controller 48 via a signal line 57. On the basis of the information, an optimum rotational frequency of the rotating drum 20 and an appropriate rate, at which the group of magnetic flocs 16 is recovered, are calculated with an optimum amount calculation program beforehand input so that a position of a liquid level of the water to be processed comes to a substantially central portion of a position, in which the magnetic rotating body 29 is mounted, that is, a position, in which an average value of a magnetic field generated by the magnetic rotating body 29 is maximum, and a control signal therefor is transmitted to a rotating motor (not shown) of the rotating drum via a signal line 58 and to the motor 35 via a signal line 59 to control the respective motors to optimum rotational frequencies.

In order that a magnetic field of the magnetic rotating body 29 magnetically attract the group of magnetic flocs 16 as washed, a water surface of water to be processed in the tank 22 is desirably positioned centrally of the magnetic field of the magnetic rotating body 29, that is, at the A-A cross section in FIG. 2. In the case where the water surface is lower than the position of the A-A cross section, a group of magnetic flocs 16 can adhere to the surface of the sludge recovery rotating body 33 only in a lower position than the water surface. Hereupon, when the magnetic rotating body 29 is stationary, a magnetic field generated by the magnetic rotating body 29 is distributed such that since magnetic fields of the respective permanent magnets as aligned are unevenly distributed on the magnet surfaces, a magnetic field generated by the group of magnets as mounted is also unevenly distributed and unevenness is caused in magnetic attraction.

Accordingly, in the case where that water surface, on which the group of magnetic flocs 16 as washed stays a lot, is present on a region, in which a magnetic attraction is small, that processing, in which the group of magnetic flocs 16 is magnetically separated and recovered, is deteriorated in capacity. According to the embodiment, in which the magnetic rotating body 29 rotates, however, since a magnetic field region, in which a magnetic field is intensely distributed, is surely caused to pass through the water surface in a short period, many groups of magnetic flocs on the water surface are magnetically attracted to adhere to the outer peripheral surface of the sludge recovery rotating body 33 and the magnetic field is made substantially equal to a moving speed of the sludge recovery rotating body 33 whereby the rotating body 30 can transport the group of magnetic flocs 16 while maintaining a magnetic attraction in the moving method, so that it is possible to prevent deterioration in that capacity, in which the magnetic flocs are recovered and processed.

On the contrary, in the case where the water surface is positionally higher than the A-A cross section, many groups of magnetic flocs 16 stay in a higher position than the water surface but are hard to adhere to the surface of the sludge recovery rotating body 33 because of a weak magnetic field. Here, in the case where the magnetic rotating body 29 is stationary, a magnetic field generated by the magnetic rotating body 29 becomes unevenly distributed and unevenness is caused in magnetic attraction. Accordingly, in the case where the water surface is present in a region, in which a magnetic attraction is small, that processing, in which the group of magnetic flocs 16 is recovered, is deteriorated in capacity. According to the embodiment, in which the magnets 29 rotate, however, since a magnetic field region, in which a magnetic field is intensely distributed, is surely caused to pass through the water surface corresponding to a configuration of magnets in a short period, the group of magnetic flocs 16 on the high water surface is magnetically attracted to adhere to the outer peripheral surface of the sludge recovery rotating body 33 and the magnetic field is made substantially equal to a moving speed of the sludge recovery rotating body 33 whereby the rotating body 30 can transport the group of magnetic flocs 16 while maintaining a magnetic attraction in the moving method, so that it is possible to prevent deterioration in that capacity, in which the magnetic flocs 16 are recovered and processed.

Also, in the case where a water surface of the water to be processed in the tank 22 rises as when a quantity filtered by the net 21 is decreased relative to an amount of inflow due to an insufficient rotational frequency of the net 21, an overflowing water recovery tank 61 is provided so as to prevent the water to be processed from overflowing a wall 60 to enter the sludge recovery tank 39 from a side of the water to be processed in the tank 22, and an overflowing water passes through a pipe 62 to enter the processed waste water tank 45 and is pressurized by the pump 46 to thereafter return to the raw water storage tank 1 through a pipe 47.

With the construction, a water surface of the water to be processed in the tank 22 rises and the water to be processed 17 overflowing the wall 60 does not enter the sludge recovery tank 39 but flows into the overflowing water recovery tank 61. Accordingly, it is possible to prevent a situation, in which a high concentration sludge recovered into the sludge recovery tank 39 is increased in water content due to inflowing of the water to be processed to become low in concentration to lead to an increase in sludge volume, and an increase in sludge processing cost is incurred.

As apparent from the above descriptions, the embodiment produces an effect that since the magnetic body composed of magnets can rotate inside the sludge recovery rotating body 33 for sludge recovery, it is possible to dissolve unevenness, caused by an uneven magnetic attraction of magnets, in that capacity, in which the group of magnetic flocs is recovered, to attain evenness, to maintain recovery in capacity, and to improve purification in capacity. In particular, the construction is effective in avoiding a phenomenon, in which clogging is liable to generate between the rotating filtering body and the sludge recovery rotating body 33.

Also, the overflowing water recovery tank is provided between the water to be processed tank and the adjacent sludge recovery tank for a high concentration sludge whereby when a water surface in the water to be processed tank rises, the water to be processed flows into the overflowing water recovery tank and overflowing water does not enter the high-concentration sludge recovery tank, so that there is produced an effect of preventing a situation, in which a high concentration sludge recovered into the high-concentration sludge recovery tank is diluted with the water to be processed to lead to an increase in sludge volume, and an increase in sludge processing cost is caused.

Embodiment 2

Figure 4:
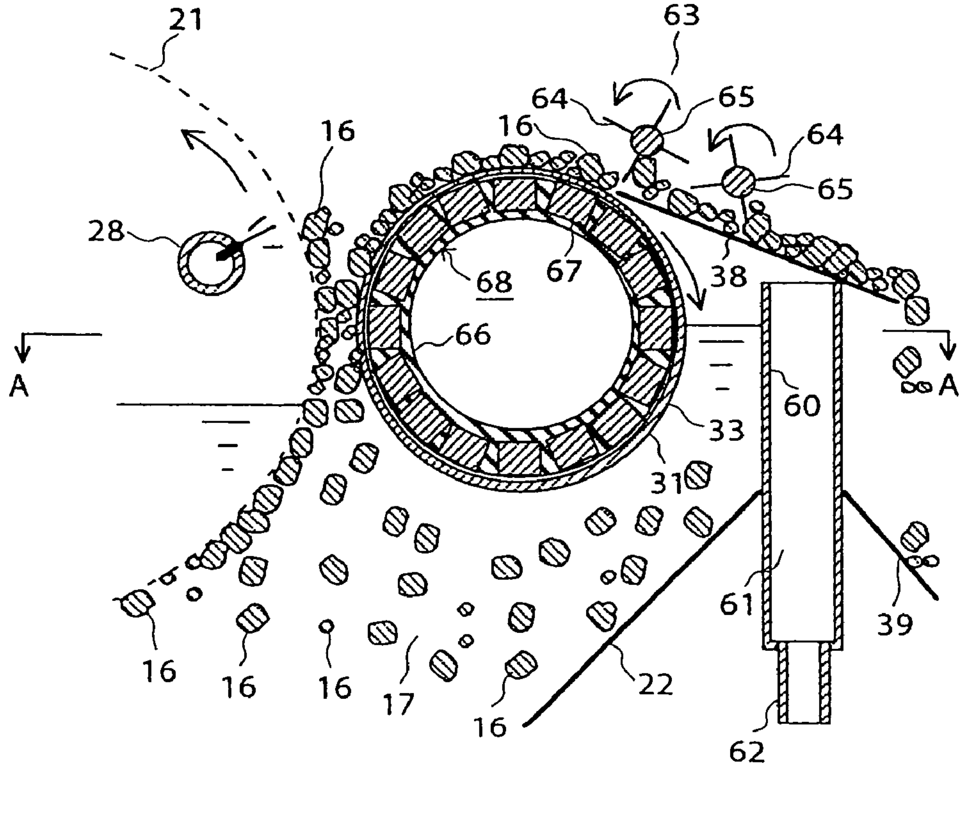
FIG. 4 is a cross sectional view showing a magnetic separation purifying apparatus according to a further embodiment of the invention.
Figure 5:
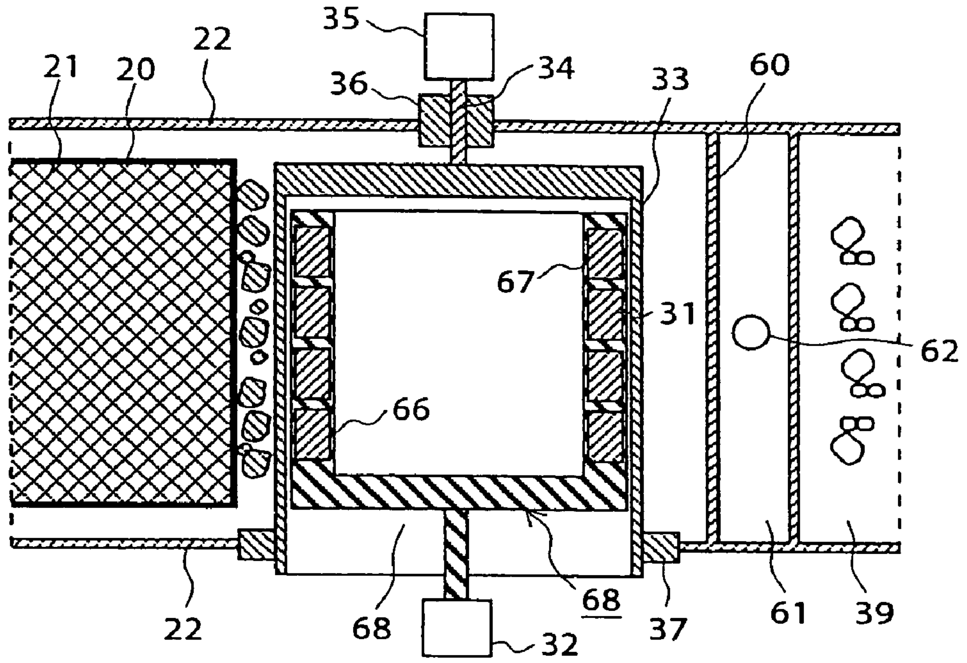
FIG. 5 is a cross sectional view taken along the line IV-IV in FIG. 4.

FIGS. 4 and 5 show a further embodiment of the invention. The same constituent elements as those in the previous embodiment are denoted by the same reference numerals as those in the latter and an explanation therefor is not duplicated. The same applies to other embodiments. The drawings are different from of the drawings of FIGS. 2 and 3 in that an outer surface of a rotating body 66 of a magnetic rotating body (corresponding to the magnetic rotating body 29 in Embodiment 1) is increased to be full inside a sludge recovery rotating body 33, an axis of the magnetic rotating body 68 and an axis of the sludge recovery rotating body 33 are caused to agree substantially with each other, and a rotary vane 63 is provided, which is mechanical means, and by which a group of magnetic flocs 16 moved onto the sludge recovery rotating body 33 by a spatula 38 is discharged toward a sludge recovery tank 39. The rotary vane 63 manufactured from a material, such as compound fluoride, etc., which is hard to stick, has a shaft 65, to which sludge discharge vanes 64 are mounted, rotationally driven by a drive source, that is, a motor (not shown). The sludge recovery rotating body 33 and the magnetic rotating body 68 rotate in the same direction to move a group of the magnetic flocs 16 as magnetically attracted, toward the atmosphere. The rotational frequencies of both bodies may be the same or different from each other. According to the embodiment, the magnetic rotating body 68 on a side of magnets is a little larger in rotational frequency than the sludge recovery rotating body 33. That is, the magnetic rotating body is made a little large in rotational frequency.

According to the embodiment, since magnets 67 constituting the magnetic rotating body 68 can be arranged close to an inside of the sludge recovery rotating body 33 over an entire periphery thereof, the magnets 67 are positioned close to a water surface in contact with an outer surface of the sludge recovery rotating body 33 even in the case where the water surface described above in Embodiment 1 is higher or lower than the A-A cross section, and the magnets 67 rotate, so that magnetic attraction acts intensely and uniformly. Accordingly, since irrespective of vertical fluctuation of the water surface, a magnetic field region, in which a magnetic field is intensely distributed, is surely caused to pass through the water surface in a short period, many groups of magnetic flocs 16 on the water surface region are magnetically attracted to adhere to the outer peripheral surface of the sludge recovery rotating body 33 and the magnetic field is made substantially equal to a moving speed of the sludge recovery rotating body 33, or magnetic forces are caused to advance forward in a direction of movement whereby it is possible to favorably move the group of the magnetic flocs 16.

Also, since a tip end portion of a spatula 38 of a scraping part and the magnets 67 are positioned close to each other, a large magnetic attraction acts on the group of magnetic flocs 16 scraped onto the sludge recovery rotating body 33 by the spatula 38 and the group of magnetic flocs 16 cannot move on the spatula 38 by it's own weight, so that sludge discharge vanes 64 move the group of magnetic flocs toward the sludge recovery tank 39 to separate the same from the magnets 31 to decrease the magnetic attraction, thus producing an effect of enabling the group of magnetic flocs to move by own weight.

Accordingly, the embodiment produces an effect that even in the case where a water surface of the water to be processed fluctuates in the tank 22, magnetic flocs can be favorably removed and deterioration in capacity of purification can be prevented.

Embodiment 3

Figure 6:
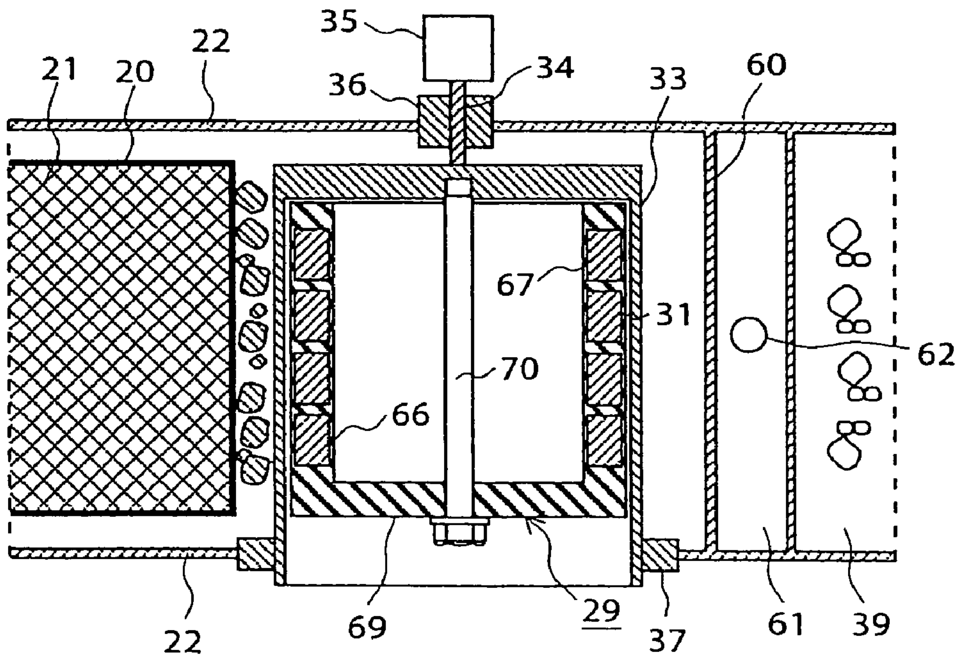
FIG. 6 is a cross sectional view showing a magnetic separation purifying apparatus according to a still further embodiment of the invention.

FIG. 6 shows a further embodiment of the invention. The drawing is different from those of FIGS. 4 and 5 in that a cylindrical-shaped magnetic rotating body 69 is increased to be full inside a sludge recovery rotating body 33 and the sludge recovery rotating body 33 and the cylindrical-shaped magnetic rotating body 69 are unified by a bolt 70.

The embodiment produces an effect that since the cylindrical-shaped magnetic rotating body 69 is unified with the sludge recovery rotating body 33 to be able to rotate together, any motor for rotation of the cylindrical-shaped magnetic rotating body 69 can be omitted and reduction in apparatus cost can be attained.

Also, while there has been shown the case where permanent magnets are used as magnetic field generating means, the same effect is produced even when constantly conducting magnets or superconducting magnets cooled by a refrigerator, etc. are used.

In addition, while the embodiment has been described with the case where the net 21 is formed to be drum-shaped, the same effect is produced even in the case where the net 21 is disk-shaped and a plurality of the disks are arranged in a longitudinal direction to constitute the apparatus.

Embodiment 4

While the rotating filtering body is used in Embodiments 1 to 3, it is also possible to attract magnetic slug, that is, sludge to the surface of the sludge recovery rotating body 33 with a magnetic force to place the same thereon without the use of the rotating filtering body.

That is, according to the embodiment, the magnetic separation purifying apparatus making use of a magnetic force to separate sludge contained in the water to be processed and to purify the water to be processed comprises a cylindrical-shaped sludge recovery rotating body arranged horizontally in a water tank to attract sludge and a magnetic substance to a surface thereof to place the same thereon upon rotation to convey the same, a magnetic rotating body, which has an axis in the sludge recovery rotating body and comprises a rotating body and a plurality of magnets mounted on a circumference of the rotating body, at least a side of which toward the rotating filtering body is arranged close to an inner peripheral surface of the sludge recovery rotating body, by which a magnetic substance filtered by the rotating filtering body is magnetically attracted to a surface of the sludge recovery rotating body whereby sludge is transported to the surface of the sludge recovery rotating body, and a scraping device that scrapes sludge and a magnetic substance being transported onto the surface of the sludge recovery rotating body.

With the construction, since the sludge recovery rotating body 33 and the magnetic body arranged therein to rotate are formed separately from each other, magnetic force acting on a magnetic substance is uniformized to further facilitate attraction control. Further, with the construction, it is possible to readily change rotations of the sludge recovery rotating body 33 and the magnetic body in phase, which is convenient in attracting and scraping a magnetic sludge.

The invention claimed is:

1. A magnetic separation purifying apparatus that makes use of a magnetic force to separate sludge contained in a processed fluid to purify the processed fluid, the magnetic separation purifying apparatus comprising:

a rotating filtering body arranged in a water tank and having a cylindrical-shaped filtering net to filter sludge and a magnetic substance from a processed fluid containing the magnetic substance;

a cylindrical-shaped sludge recovery rotating body facing the rotating filtering body to be horizontally close thereto, the sludge recovery rotating body rotating to place sludge and the magnetic substance on a surface thereof to convey the same;

a magnetic rotating body, which has an axis in the sludge recovery rotating body and comprises a rotating body and a plurality of magnets mounted on a circumference of the rotating body, the magnetic rotating body rotating, independently of the sludge recovery rotating body, around its axis, the axis being concentric with respect to the plurality of magnets, at least a side of said magnetic rotating body toward the rotating filtering body being arranged close to an inner peripheral surface of the sludge recovery rotating body, by which the magnetic substance filtered by the rotating filtering body is magnetically attracted to a surface of the sludge recovery rotating body, whereby sludge is transported onto the surface of the sludge recovery rotating body; and a scraping device that scrapes sludge and the magnetic substance being transported on the surface of the sludge recovery rotating body.

2. The magnetic separation purifying apparatus according to claim 1, wherein the magnetic rotating body is arranged to be eccentric relative to the sludge recovery rotating body.

3. The magnetic separation purifying apparatus according to claim 1, wherein the magnetic rotating body is arranged to be coaxial with the sludge recovery rotating body and a rotary vane rotationally driven by a drive source is provided above and close to a surface of the sludge recovery rotating body.

4. The magnetic separation purifying apparatus according to any one of claims 1 to 3, further comprising an overflowing water collecting device, into which water to be processed overflows from the water tank.

5. A magnetic separation purifying apparatus that makes use of a magnetic force to separate sludge contained in a processed fluid to purify the processed fluid, the magnetic separation purifying apparatus comprising:

a cylindrical-shaped sludge recovery rotating body arranged in a water tank to be positioned horizontally and rotating to attract and place sludge and a magnetic substance on a surface thereof to convey the same;

a magnetic rotating body which has an axis in the sludge recovery rotating body and comprises a rotating body and a plurality of magnets mounted on a circumference of the rotating body, the magnetic rotating body rotating, independently of the sludge recovery rotating body, around its axis, the axis being concentric with respect to the plurality of magnets, at least a side of said magnetic rotating body being arranged close to an inner peripheral surface of the sludge recovery rotating body, by which the magnetic substance is magnetically attracted to a surface of the sludge recovery rotating body, whereby sludge is transported onto the surface of the sludge recovery rotating body; and a scraping device that scrapes sludge and the magnetic substance being transported on the surface of the sludge recovery rotating body.

6. A magnetic separation purifying method that makes use of a magnetic force to separate sludge contained in a processed fluid to purify the processed fluid, the magnetic separation purifying method comprising:

filtering sludge and a magnetic substance from water to be processed containing the magnetic substance by means of a rotating filtering body arranged in a water tank to have a cylindrical-shaped filtering net;

using a magnetic rotating body, which has an axis in a cylindrical-shaped sludge recovery rotating body, the magnetic rotating body rotating, independently of the sludge recovery rotating body, around its axis, the axis being concentric with respect to the plurality of magnets, at least a side of said magnetic rotating body toward the rotating filtering body being arranged close to an inner peripheral surface of the sludge recovery rotating body, and which comprises a plurality of circumferentially arranged magnets, to magnetically attract the magnetic substance, which is filtered by the rotating filtering body to stay on a water surface of a processed fluid between the magnetic rotating body and the rotating filtering body, to a surface of the sludge recovery rotating body and transporting sludge to the surface of the sludge recovery rotating body; and scraping magnetic flocs containing sludge and the magnetic substance being transported onto the surface of the sludge recovery rotating body.

7. The magnetic separation purifying method according to claim 6, wherein the magnetic rotating body is arranged to be eccentric relative to the sludge recovery rotating body, whereby the sludge recovery rotating body rotates in spaces, which are large and small in magnetic strength.

* * * * *